Dec. 31, 1929.  H. LANGE  1,741,468
HEATER
Filed Dec. 17, 1928
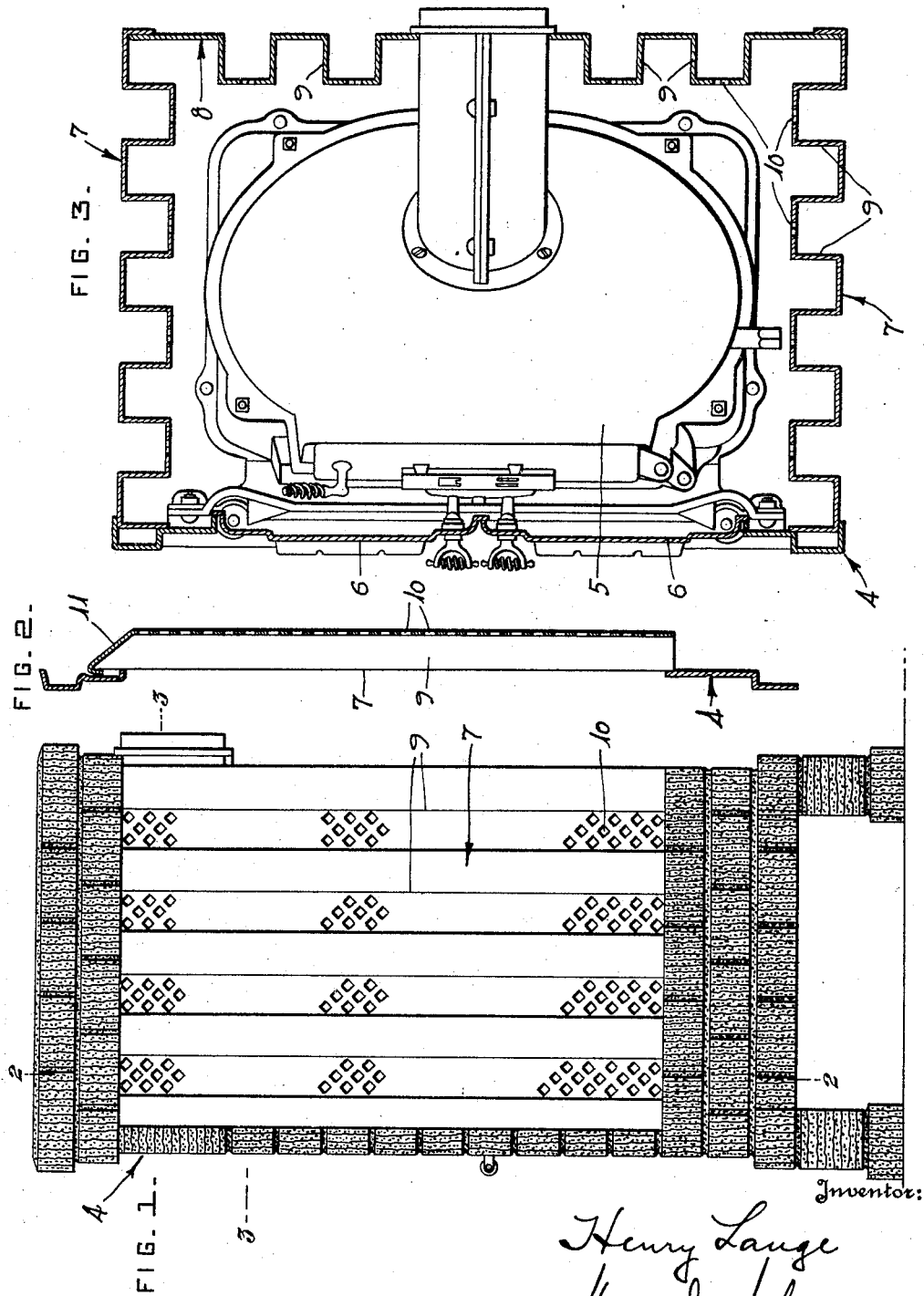

Patented Dec. 31, 1929

1,741,468

UNITED STATES PATENT OFFICE

HENRY LANGE, OF QUINCY, ILLINOIS, ASSIGNOR TO THE QUINCY STOVE MANUFACTURING COMPANY, OF QUINCY, ILLINOIS, A CORPORATION OF ILLINOIS

HEATER

Application filed December 17, 1928. Serial No. 326,617.

The present invention relates to heaters, more particularly the air circulating type of heater comprising a stove and a casing surrounding same, of the general type disclosed in my Patent No. 1,695,658, granted December 18, 1928.

Up until the present time it has been the general practice to construct a circulating type of heater with substantially flat or straight walls, that is, with a casing of rectangular outline in plan. The usual space between the stove or heat unit and the casing walls is from two to three inches. This has been found to considerably reduce the heat radiated from the stove or heat unit, whereas a greater radiation of heat is usually appreciated by users who are accustomed to the style of heating stoves from which the heat is radiated. The casing surrounding the stove or heat unit for producing a circulating type of heater serves as a barrier to the radiation of heat.

It is the object of the present invention to provide a casing for the air circulating type of heater which will have an increased radiating surface, so as to increase the heat radiated from the walls of the casing.

Another object is the formation of the casing with corrugations extending upwardly and downwardly to form air channels on the inside and outside of the casing, and to increase the radiating surfaces of the casing.

Another object is the provision of apertures in the corrugations to facilitate the radiation of the heat from the stove or heat unit through the walls of the casing.

By the provision of the improved casing the present heater combines the features of the air circulating type of heater and the heat radiating type of heater.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved heater.

Fig. 2 is a vertical section and Fig. 3 a horizontal section on the respective lines 2—2 and 3—3 of Fig. 1.

The heater illustrated in the drawing is of the same type as disclosed in Patent No. 1,695,658, and comprises the casing 4 surrounding the stove or heat unit 5, to provide an air circulating space between them for the upward flow of air to be heated by the stove and discharged through the upper portion or top of the casing. As shown, the front wall of the casing has the doors 6 which may be opened for access to the doors of the stove, and the sides 7 and back 8 of the casing may be of sheet metal or may be cast from suitable metal. As shown, the casing is rectangular in plan.

The side and back walls of the casing, in carrying out the invention, are provided with vertical corrugations 9, and as shown the corrugations have right-angled corners and flat sides and inner and outer walls. However, the corrugations may be of different forms, and may be provided at any desired part of the casing, in one or more walls thereof.

The inner walls of the corrugations are provided with apertures 10, preferably throughout the width and length thereof, so that the heat rays may pass directly outward from the stove 5 through the walls of the casing and the other portions of the corrugations are imperforate. Thus, the corrugations not only increase the radiating surfaces of the casing considerably, but also provide vertical channels therein at the inner and outer surfaces of the casing for the upward flow of air in said channels so as to increase the convection of heat from the casing walls to the air on the inside and outside of the casing.

The heat rays which are radiated from the stove pass into the inner channels of the corrugations, not only to heat the air flowing upwardly within the casing, but to also heat the corrugations, and the heat rays also pass through the apertures 10 and the outer air channels. As a result, considerably more heat is radiated from the heater than with the present types of casings. It will be noted that the corrugations are formed by offsetting portions of the casing walls inwardly toward the stove or heat unit, so that the walls or portions of the corrugations having the apertures 10 are close to the stove. The air channels formed by the corrugations are open at their lower ends for the upward flow of air in said channels, and the upper ends of the outer channels are preferably closed, as seen at 11 in Fig. 2, so that the air in the outer channels is delivered outwardly from the walls of the casing. The radiating surfaces of the casing are increased at least 50% by the use of the corrugations, and the apertures 10 also add to the volume of heat radiated from the heater.

Having thus described the invention, what is claimed as new is:—

1. An air heater comprising a heat unit, and a casing surrounding same and having a wall formed with corrugations producing inner and outer channels extending upwardly and downwardly, for the upward flow of air in said channels at the inside and outside of the casing, those portions of the corrugations nearest to the heat unit having apertures for the passage of heat rays outwardly through the outer channels, the other portions of the corrugations being imperforate.

2. An air heater comprising a heat unit, and a casing surrounding same and having a wall formed with corrugations producing inner and outer channels extending upwardly and downwardly, for the upward flow of air in said channels at the inside and outside of the casing, those portions of the corrugations nearest to the heat unit having apertures for the passage of heat rays outwardly through the outer channels, the other portions of the corrugations being imperforate, the lower ends of the outer channels being open and the upper ends thereof being closed.

In testimony whereof I hereunto affix my signature.

HENRY LANGE.